United States Patent [19]
Sakai

[11] Patent Number: 5,206,730
[45] Date of Patent: Apr. 27, 1993

[54] STILL VIDEO CAMERA HAVING ONE-SHOT AND SERIAL SHOT MODES

[75] Inventor: Yuki Sakai, Hachioji, Japan

[73] Assignee: Konica Corporation, Tokyo, Japan

[21] Appl. No.: 844,932

[22] Filed: Mar. 4, 1992

Related U.S. Application Data

[63] Continuation of Ser. No. 606,319, Oct. 31, 1990, abandoned.

[30] Foreign Application Priority Data

Nov. 10, 1989 [JP] Japan .................................. 1-293601

[51] Int. Cl.[5] .............................................. H04N 5/30
[52] U.S. Cl. .................................... 358/209; 358/335; 358/909
[58] Field of Search ............... 358/209, 909, 906, 337, 358/339, 312, 334, 335; 354/3, 7

[56] References Cited

U.S. PATENT DOCUMENTS

| 4,584,613 | 4/1986 | Amari et al. | 358/310 |
| 4,837,628 | 6/1989 | Sasaki | 358/209 |
| 4,887,161 | 12/1989 | Watanabe et al. | 358/224 |
| 4,928,137 | 5/1990 | Kinoshita | 358/213.26 |

FOREIGN PATENT DOCUMENTS 0366317 2/1989 European Pat. Off.

Primary Examiner—Herbert Goldstein
Assistant Examiner—Tuan V. Ho
Attorney, Agent, or Firm—Finnegan, Henderson, Farabow, Garrett & Dunner

[57] ABSTRACT

A digital still video camera having a plurality of photographing modes. The camera includes a switch for selecting one of the plurality of photographing modes, CCD for photographing an image to output a digital image signal in accordance with the selected photographing mode, a circuit for processing the digital image signal in synchronization with a clock signal and an oscillator for generating the clock signal and output the clock signal to the circuit, the oscillator adapted to change the frequency of the clock signal in accordance with the selected photographing mode so that the circuit changes its processing speed in accordance with the selected photographing mode.

2 Claims, 2 Drawing Sheets

STILL VIDEO CAMERA HAVING ONE-SHOT AND SERIAL SHOT MODES

This application is a continuation of application Ser. No. 07/606,319, filed Oct. 31, 1990, now abandoned.

BACKGROUND OF THE INVENTION

The present invention relates to a digital still video camera in which a still image is stored as digital data, and particularly relates to a digital still camera which consumes low electric current.

Recently, a digital still video camera in which an image is stored in a semiconductor memory such as a memory card, has been used instead of a still video camera in which a still image is recorded in a video floppy disk.

At the outset, referring to FIG. 3, the outline of a conventional digital still video camera will be explained as follows. The numeral 1 is a SSG which impresses the clock of the frequency $f_{clk}$ upon each portion of the digital still video camera. The numeral 2 is a CCD which functions as a light receiving unit which receives light from a photographic object and conducts photoelectric transfer so that an image signal can be generated. The numeral 3 is an A/D converter which converts the image signal sent from CCD 2 into digital image data. The numeral 4 is a frame memory which temporarily accumulates the digital image data. The numeral 5 is a digital processing circuit which converts the digital image data into the signals of Y, I, Q. The numeral 6 is a data compression circuit which compresses the data of signals Y,I,Q so that the amount of data can be reduced. The numeral 7 is a memory which stores the digital image data sent from the data compression circuit. This memory 7 is composed of a semiconductor memory provided in the digital still video camera or composed of an IC card (a card memory) which can be attached to and detached from the camera. The numeral 10 is a CPU which controls each unit. The numeral 11 is an operation panel which is used for the operation and changeover of various operation modes such as one shot photographing and serial shot photographing. The numeral 12 is a release switch.

The motions of the digital still video camera composed in the way described above are as follows.

When the serial shot photographing mode is selected by the operation panel 11 and the release switch 12 is pressed, the output signal of the CCD sensor 2 is converted into the digital image data at the A/D converter 3 and stored once in the frame memory. After that, the output signal is converted into the signals Y,I,Q at the digital procession circuit 5. Then, this is compressed by the data compressing circuit 6 and recorded in the memory 7. While the release switch 12 is pressed, these sequential motions are continuously conducted.

On the other hand, when the one shot photographing mode is selected at the photographing mode in the operation panel 11, and the release switch 12 is pressed, the output signal of the CCD sensor 2 is converted into the digital image data in the A/D converter 3 and stored once in the frame memory. These motions are conducted for each frame.

In the case of the above-described digital still video camera, when the serial shot photographing of 10 frames/sec is conducted, it is necessary to complete the process from picture-taking to the final processing in 100 msec per one sheet. In order to read out the data from the CCD sensor and store it in the frame memory, 33.3 msec (1/60 sec) is needed out of 100 msec, so that the signal conversion (the conversion from the image signal to the signals Y,I,Q) and the data compression must be conducted in the residual 66.7 msec. When the number of pixels of CCD is 400,000 (H800×V500), the signals Y,I,Q becomes as follows at the digital processing unit.

$Y = 800 \times 500 = 0.4M$ byte
$I = 400 \times 500 = 0.2M$ byte
$Q = 400 \times 500 = 0.2M$ byte Namely, one image is converted into the data of 0.8 m byte. Accordingly, 66.7 msec/0.8M byte = 83.4 nseC/byte. This shows that the data needs to be processed in 83.4 nsec per byte.

When the data is processed at a high speed, CMOSIC is used and clock drive is conducted so that the processing can be completed in the processing time described above. The clock frequency is the same in one shot photographing and serial shot photographing.

The consumptive electric power is increased in proportion to the clock frequency, so that electric power not less than 1 W is spent in the processing circuit and the data compression circuit.

When driving is conducted by a high frequency in the case of one shot photography in which high speed processing is not necessary, it is not effective in view point of consumptive electric power. Especially, when the consumptive electric current is high in the case of a battery, the battery is consumed quickly due to the internal resistance. In other words, even when the consumed electric power (voltage X current X time) is the same, the efficiency is lowered in the case in which a large amount of current is flown for a short period of time as compared with the case in which a small amount of current is flown for a long period of time.

SUMMARY OF THE INVENTION

The present invention has been achieved under the circumstances described above. The object of the present invention is to realize a digital still video camera which consumes a small electric current.

In order to solve the problems described above, the present invention provides a digital still video camera in which a still image is recorded as digital data, comprising: a mode setting means by which the one shot photographing mode or the serial shot photographing mode can be set; and a clock frequency changing means by which the clock frequency can be changed over according to the mode which was set by the mode setting means.

In the digital still video camera of the present invention, the clock frequency setting means changes over the clock frequency according to the mode which was set by the mode setting means. In the case of the one shot photographing mode, the clock frequency is set low compared with the serial shot photographing mode, so that the consumptive current is reduced.

DETAILED DESCRIPTION OF THE PREFERRED EMBODIMENTS

Figure 1:
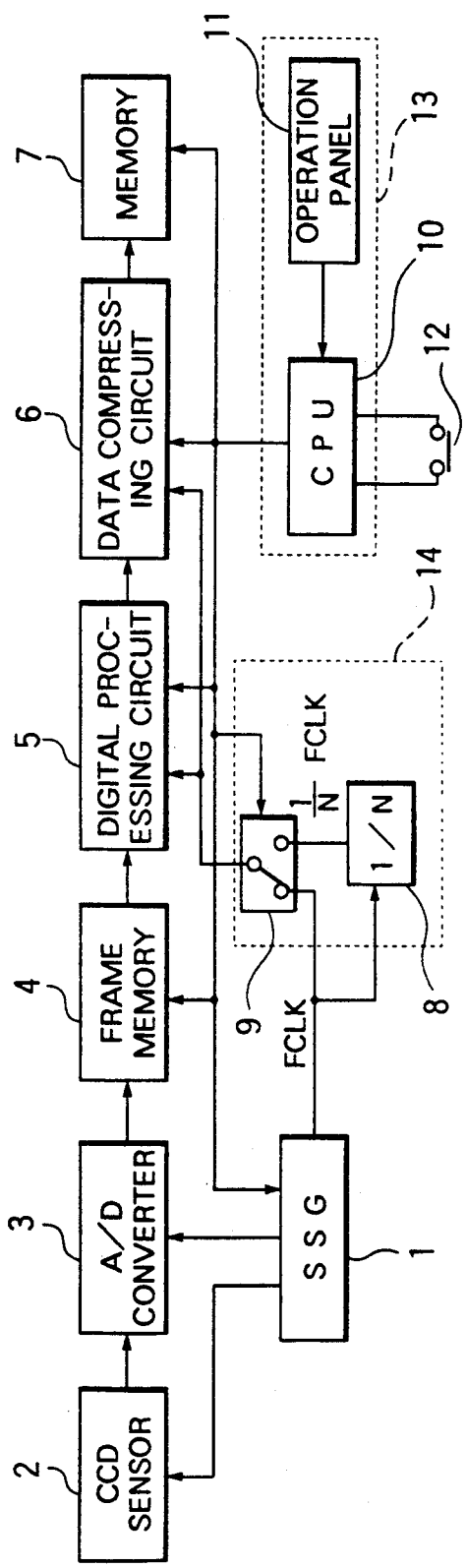
FIG. 1 is a schematic illustration which shows the composition of an example of the present invention.

Referring now to the drawings, the detailed of the example of the present invention will be explained as follows.

At the outset, referring to FIG. 1, the outline of the digital still video camera of the present invention will be explained. In FIG. 1, the numeral 1 is a SSG which impresses the clock of the frequency $f_{clk}$ upon each unit of the digital still video camera. The numeral 2 is a CCD which functions as a light receiving unit generating an image signal by conducting photoelectric transfer after receiving light from a photographic object. The numeral 3 is an A/D converter which converts an image signal sent from CCD 2 into digital image data. The numeral 4 is a frame memory to accumulate digital image data temporarily. The numeral 5 is a digital data processing circuit which converts the digital image data into the signals Y,I,Q The numeral 6 is a data compression circuit which reduces the amount of data by compressing the data of signals Y,I,Q. The numeral 7 is a memory which stores the digital image data sent from the data compression circuit. This memory 7 is composed of a semiconductor memory which is provided in the digital still video camera, and composed of an IC card which is capable of being attached to and detached from the camera. The numeral 8 is a frequency divider which divides the clock of the frequency $f_{clk}$ sent from SSG1 into 1/N. The numeral 9 is a selector switch which changes over the clock frequency supplied to the digital process circuit 5 and the data compression circuit 6 to one of $f_{clk}$ and $f_{clk}/N$. The numeral 10 is a CPU which controls each unit. The numeral 11 is a control panel which operates and changes over various operation modes such as the photographing modes of the one shot photographing mode and serial shot photographing mode. The numeral 12 is a release switch. The numeral 13 is a mode setting means composed of the CPU 10 and the control panel 11. The numeral 14 is a clock frequency changing means composed of the frequency divider 8 and the selector switch 9.

The operation of the digital still video camera composed in the way described above will be described as follows.

When the serial shot photographing mode is selected by the control panel 11, CPU 10 detects it and the selector switch 9 is changed over to the side of $f_{clk}$. Consequently, the clock of high frequency $f_{clk}$ which is adequate for high speed serial shot photographing, is supplied to the digital process circuit 5, the data compression circuit 6, and other units. When the release switch 12 is pressed, the output signal of the CCD sensor 2 is converted into the digital image data by the A/D converter 3, stored once in the frame memory, and converted into the signals Y,I,Q by the digital process circuit 5. After the signals Y,I,Q has been compressed by the data compression circuit 6, they are recorded in the memory 7. A series of the motions described above are continuously conducted while the release switch 12 is pressed.

On the other hand, when the one shot photographing is selected by the control panel 11, it is detected by the CPU 10 and the selector switch 9 is changed over to the side of $f_{clk}/N$. Accordingly, the clock of low frequency is supplied to the digital process circuit 5 and the data compression circuit 6, and the clock of high frequency is supplied to other units. When the release switch 12 is pressed at this moment, the output signal of the CCD sensor 2 is converted into the digital image data by the A/D converter 3 and stored once in the frame memory. The digital image data is processed by the digital process circuit 5 and the data compression circuit 6 which are driven by $f_{clk}/N$. In this case, one shot photographing is conducted, so that there is time to spare after one frame of photographing has been conducted. Accordingly, there is caused no problem even when processing, data compression and writing into the memory 7 are conducted at a low speed.

When the digital processing is conducted by the clock of 1/N in this way, the consumptive electric power per unit time is also reduced to 1/N. However, the period of time for processing is increased to N times since the clock frequency is reduced to 1/N, so that the consumptive electric power is the same. However, it has been widely known that according to the characteristic of a battery, a large amount of electric power can be obtained from the battery in the case a small electric current is flown for a long period of time as compared with the case in which a large electric current is flown for a short period of time, which is due to the internal resistance of the battery. This can be true in the case of a primary battery and a secondary battery. The digital still video camera is usually powered by a battery, so that the battery can stand long use when the camera is composed in the above-described structure.

Figure 2:
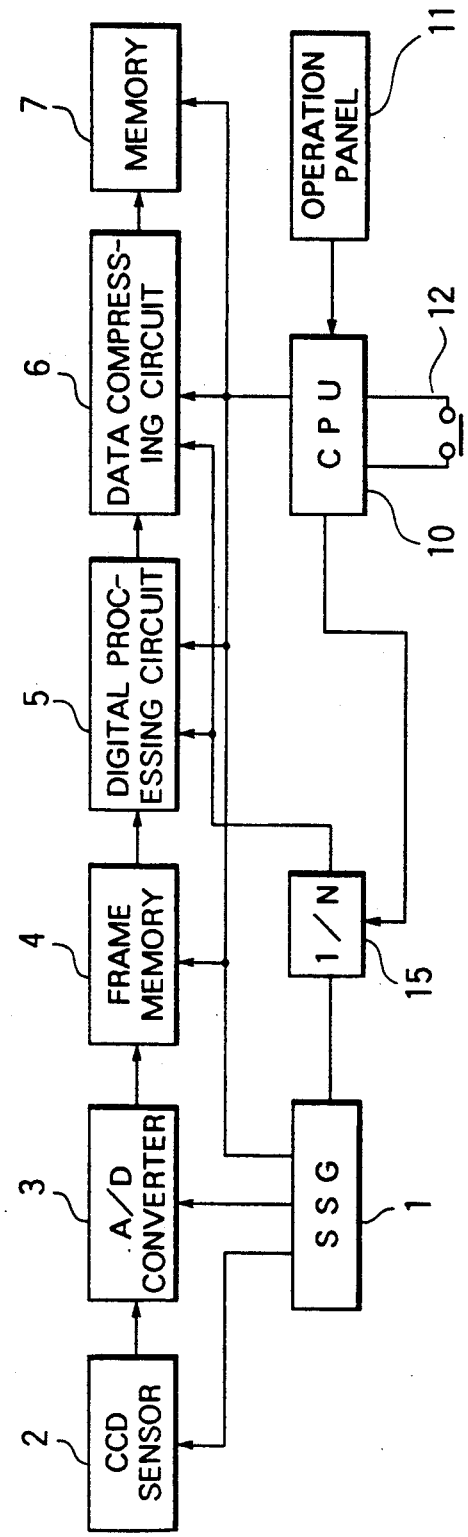
FIG. 2 is a schematic illustration which shows the composition of another example of the present invention.
Figure 3:
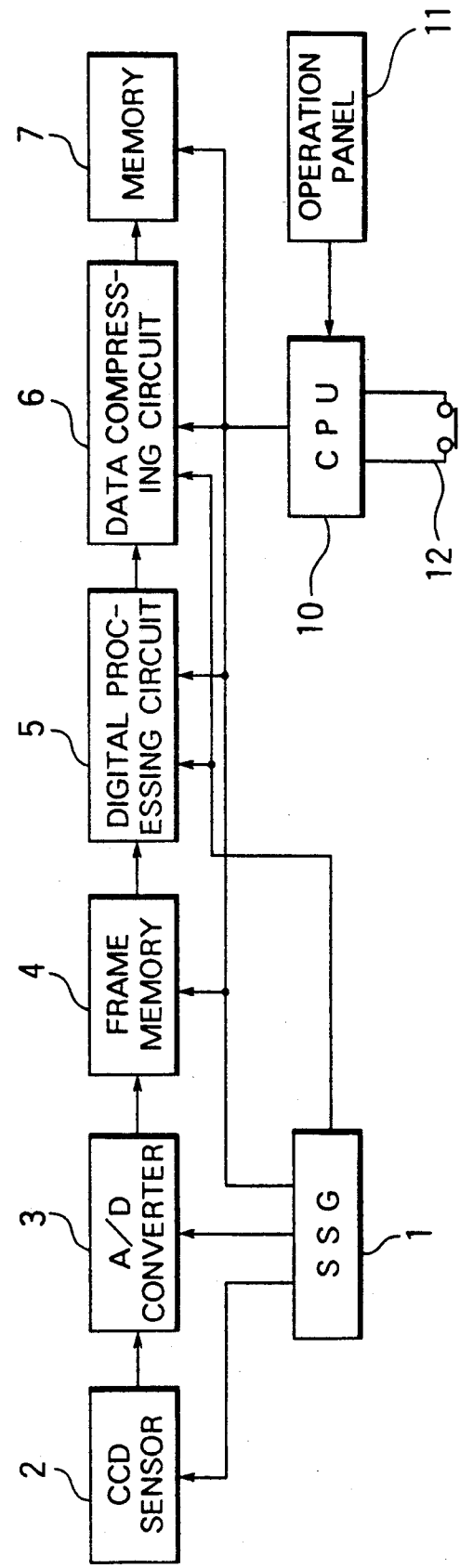
FIG. 3 is a schematic illustration which shows the composition of a conventional digital still video camera.

FIG. 2 is a schematic illustration which shows the structure of another example of the present invention. Referring now to the drawings, like reference characters designate corresponding parts throughout FIG. 1 and FIG. 2. The numeral 15 is a frequency divider, the frequency dividing ratio of which is controlled by the CPU 10. Accordingly, the frequency dividing ratio is controlled by the photographing mode so that the clock frequency which is at least necessary to process, can be obtained. Even when there are a plurality of photographing modes such as one shot photographing, middle speed serial shot photographing and high speed serial shot photographing, the camera can be adapted to the situation by changing the frequency dividing ratio according to the direction of the CPU 10. Therefore, the battery power can be effectively utilized in this example, too.

EFFECT OF THE INVENTION

As the detail of the invention is described above, the present invention is to provide a digital still video camera in which a still image is recorded as digital data, comprising: a mode setting means by which the one shot photographing mode or the serial shot photographing mode can be set; and a clock frequency changing means by which the clock frequency can be changed over according to the mode which was set by the mode setting means, so that the clock frequency can be changed over according to the mode. Consequently, it has become possible to process at an adequate speed according to the photographing mode, so that the digital still video camera in which the battery can stand long use by reducing the consumptive current, can be realized.

What is claimed is:

1. A still video camera having a one-shot mode for photographing one frame and a serial-shot mode for photographing a plurality of successive frames at a specific frequency, the camera comprising:

means for selecting between the one-shot mode and the serial-shot mode;
means for generating a digital signal representative of the frame being photographed;
a frame memory for temporarily storing and then transmitting the digital signal, the frame memory having the capacity to store the digital signal corresponding to at least one frame;
a semiconductor memory;
means for processing the digital signal from the frame memory, the processing means changing its operating speed in synchronization with the frequency of a clock signal;
means for compressing the digital signal from the processing means for storage in the semiconductor memory, the compressing means changing its operating speed in synchronization with the frequency of the clock signal;
the semiconductor memory storing the processed and compressed digital signal in synchronization with the operating speed of the processing means and the compressing means;
clock means for providing the clock signal to the processing means and compressing means at different frequencies in accordance with the selected mode so that the processing means and compressing means change their operating speed in accordance with the selection mode and so that the semiconductor memory stores the processed and compressed digital signal at a speed and power consumption in the one-shot mode lower than the speed and power consumption in the serial-shot mode; and
a battery for supplying power to the selecting means, the generating means, the frame memory, the semiconductor memory, the processing means, the compressing means, and the clock means.

2. The camera as claimed in claim 1, wherein the selecting means includes means for selecting the specific frequency for photographing in the serial-shot mode, and wherein the clock means changes the frequency of the clock signal in accordance with the specific frequency selected.

* * * * *